United States Patent [19]

Nelson

[11] Patent Number: 4,806,931

[45] Date of Patent: Feb. 21, 1989

[54] SOUND PATTERN DISCRIMINATION SYSTEM

[75] Inventor: Thomas M. Nelson, Scotts Valley, Calif.

[73] Assignee: Richard W. Clark, Phoenix, Ariz.

[21] Appl. No.: 147,900

[22] Filed: Jan. 25, 1988

[51] Int. Cl.[4] .............................................. G08G 1/095
[52] U.S. Cl. .................................... 340/907; 340/902; 340/906; 367/199; 381/56
[58] Field of Search ............... 340/917, 901, 902, 904, 340/906, 943, 384 E, 384 R; 367/197–199; 381/56, 57

[56] References Cited

U.S. PATENT DOCUMENTS

| | | | |
|---|---|---|---|
| 3,992,656 | 11/1976 | Joy | 340/906 |
| 4,212,085 | 7/1980 | Vaillancour et al. | 340/902 |
| 4,625,206 | 11/1986 | Jensen | 340/902 |
| 4,759,069 | 7/1988 | Bernstein et al. | 340/902 |

Primary Examiner—Donnie L. Crosland
Attorney, Agent, or Firm—LaValle D. Ptak

[57] ABSTRACT

A system is provided for the detection and recognition of pre-established sound patterns such as the various patterns produced by the sirens of emergency vehicles. The system includes a microprocessor which programmed with pre-established sequence detection algorithms corresponding to the different types of emergency vehicles sirens signal patterns which are to be recognized. A first omnidirectional microphone is coupled through a bandpass circuit to a trigger circuit to produce square wave signals representative of analog signals in the band of interest. At least two directional microphones are coupled through similar bandpass amplifier circuits to analog digital converters which produce a digital output representative of the strength of the signals received by the directional microphones. This directional information along with the output of the Schmitt trigger is supplied to the microprocessor which is used to control the signal lights at an intersection in response to the detected siren.

18 Claims, 3 Drawing Sheets

SOUND PATTERN DISCRIMINATION SYSTEM

BACKGROUND

This invention relates to an all-electronic system for the detection, recognition, and positive identification of particular repetitive or non-repetitive sound patterns, and more particularly to a system for the selective monitoring and recognition of emergency signals, such as sirens, for effecting remote control of traffic signal devices.

Briefly, the present invention has primary application to the detection of emergency vehicle signals and accomplished its stated function by means of a digitally controlled, microcontroller or microprocessor pattern recognition algorithm. This algorithm functions in response to recognition of consecutive tones of different frequencies occurring in a particular pattern, established by the algorithm, to actuate a traffic signal control relay. The algorithm can be modified or preprogrammed to respond to a variety of predetermined repetitive sound patterns, while simultaneously functioning to reject unwanted or extraneous sounds and sound combinations.

The particular application and embodiment described is designed to detect and to recognize the sound of a particular operating mode of an emergency vehicle siren, such as "yelp", "wail", or "hi-low", for the purpose of controlling the operation of traffic signals at an intersection. This control is effected to make it easier and safer for an emergency vehicle to traverse the intersection. The system may be programmed to reject all extraneous sounds and sound combinations, including other siren operating modes other than a single mode to which the system is made responsive. Alternatively, the system also is capable of recognizing various operating siren modes and assigning a priority intersection control of the traffic signals to a particular mode as determined by the siren patterns. For example, priority operation could be assigned to the "yelp" mode of operation over either a "wail" or "hi-low" mode of operation, even though in absence of a "yelp" siren, one of these other modes could control the operation of the traffic signal lights.

By way of further explanation, the audio characteristics of all three of the above-identified operating modes of typical sirens including changing audio tones or sounds which have a lower frequency of approximately 500 Hz and which vary in some pattern to a frequency as high as 1600 Hz. For a "yelp" siren, this is accomplished in a sweep upwardly from the low end of this frequency range to the upper end, with a more sudden drop back down again to the low frequency for each single cycle of the "yelp" mode. This cycle then is repeated at a rate of one to four cycles per second. The exact frequency range covered and the cycle repetition rate depends on the particular model and type of siren.

For a "wail", the frequency range again is from a low frequency as low as 500 Hz, changing substantially in accordance with a sine-wave pattern to an upper frequency and back down again on a continuous basis. The repetition rate or frequency of this sine-wave variation generally is at a lower frequency than for the "yelp" operating mode. "Hi-low" sirens usually employ two frequencies with a sudden transition between the low frequency to the high frequency and back again at a rate of repetition similar to the repetition rate used in a "wail" siren.

The general utility of any system for controlling the traffic signal light at an intersection by an approaching emergency vehicle is explained in detail in U.S. Pat. No. 3,550,078. This patent discloses a system utilizing a photovoltaic detector at the traffic signal and a special high intensity lamp mounted on each emergency vehicle. The emergency vehicle lamp is directed at the detector and causes operation of the traffic signal light system to be controlled in a preestablished manner upon a sensing by the detector of an emergency vehicle lamp. This system, however, requires a modification of the emergency vehicle to add the high intensity lamp in addition to a provision of the detecting circuit at the traffic signal. If the orientation of the vehicle is such that the lamp carried by it is not properly aligned with the photovoltaic detector, the desired control does not take place, which could result in a dangerous situation for an emergency vehicle operator relying upon the anticipated control function occuring.

A number of other systems having a capability of responding to particular sounds, such as sirens or automobile horns, also have been developed. Representative systems are described in U.S. Pat. Nos. 3,568,144 and 3,735,342, both of which are designed to be mounted in a vehicle for the purpose of altering the driver of the nearby presence of an emergency vehicle siren and, in one case, also the presence of an automobile horn and a train whistle. Neither of these patents, however, make any mention of traffic signal light control.

Specifically, U.S. Pat. No. 3,568,144 describes an apparatus which is asserted to be capable of responding to the sound of a train whistle, an automobile horn, and an emergency vehicle siren. The apparatus is designed to display each of these responses separately and accomplished this purpose by means of three different channels. Each of these channels includes a band-pass filter, with one filter being tuned to the characteristic frequency of train whistles, the second being tuned to the characteristic frequency of automobile horns, and the third being tuned to the characteristic frequency of sirens. The system of this patent, however, has some significant drawbacks. First, the use of one band-pass filter to respond to the characteristic frequency of automobile horns does not work because automobile horns do not have a single characteristic frequency. The frequency of the horns varies with the make and model of automobile. In addition, most automobiles carry two horns, one of low pitch and one of high pitch, to produce a more pleasing tone. If the pass-band of the filter is made so broad so as to include the characteristic frequencies of most horns (including the low and high frequencies), the system would have no discriminating ability and would respond to many other sounds. The same reasoning holds true for a train whistle. Although the frequency range for various train whistles is narrower than various horns, the frequency range for whistles overlaps the frequency range for horns. Obviously, a siren does not have a single characteristic frequency, but sweeps a rather wide spectrum, as explained above. This frequency spectrum overlaps the frequency range of both horns and whistles. In addition, even with narrow band filters, the circuit of U.S. Pat. No. 3,568,144 has poor discriminating ability. Most street noises have a complex spectrum of sounds which contains audio components of different frequencies, and these noises are capable of causing almost constant false triggering of a circuit of the type disclosed in U.S. Pat. No. 3,568,144.

U.S. Pat. No. 3,735,342 relates to a tone responsive circuit capable of responding to the sound of an emergency vehicle siren. The system of this patent is an improvement over the systems of the patents described above inasmuch as sounds of three different frequencies must be detected within a predetermined time period, ten seconds, by means of three band-pass filters before a response is obtained from the system. An SCR sequencing circuit is used so the sounds must occur in a predetermined sequence. There is no delay time built into the sequencer, except for the inherent turn-on time of an SCR, which typically is less than 0.5 microseconds. Since the period of one cycle of a 1000 Hz tone is 1 millisecond, from a practical standpoint in audio work, a period as short as 0.5 microseconds may be considered to be instantaneous. Thus, three simultaneous tones at the proper frequencies cause the circuit to respond, as will the same three tones occurring in any sequence whatever, so long as there is at least a 1 to 2 microsecond overlap in the tones. The system of this patent does not include any effective means of rejecting unwanted sounds and therefore easily can be triggered by any broad band noise source. At best, this circuit may be considered to be a tone detector for a three-tone signal, but it essentially is ineffective as a useful sound pattern discriminator.

The system of U.S. Pat. No. 3,992,656 overcomes some, but not all, of the disadvantages of the above prior art systems. The '656 system detects siren frequencies in a sequential or reverse sequential order to control a traffic signal light. This system, however, does not have the capability of directional discrimination, nor does it respond uniquely to different sound patterns. In addition, it requires multiple band-pass filters of different narrow band characteristics within the pass-band of interest, along with timing circuits and gates, for effecting the desired control output signal in response to a preestablished sequential occurrence of resonant frequencies passed by the various different band-pass filter channels.

An attempt is made in U.S. Pat. No. 4,212,085 for providing an emergency vehicle direction indicator. This patent utilizes three different sound detectors which are directionally oriented to sense the siren in different directions. No provision, however, is made for detecting a second or additional frequency within the sound pattern of each detector.

A sound pattern discrimination system for providing improved rejection of extraneous noise and also for providing directional control of a traffic signal light is disclosed in U.S. Pat. No. 4,625,206. The system of this patent is particularly suitable for detecting "yelp" sirens and employs a number of different narrow band-pass filter channels which are enabled sequentially in accordance with the anticipated pattern of the emergency vehicle siren signal. The entire system is duplicated for each of at least two different directional microphones to permit selective directional control of the traffic signals operated by the system. The various filters and sequentially enabled timing and gate circuits, however, result in a relatively expensive circuit installation which additionally must be initially tailored to respond to one of the various types of siren signals which might exist. Once the system has been configured to respond to the pattern of a particular siren, it does not respond to other different emergency vehicle siren signal patterns.

Accordingly, it is desirable to provide a sound pattern discrimination system particularly useful for controlling traffic signal lights in response to emergency vehicle sirens, which effectively eliminates false operation in response to extraneous noise, is less complex than the prior art devices, and which overcomes the disadvantages of the devices of the prior art.

SUMMARY OF THE INVENTION

Accordingly, it is an object of this invention to provide an improved sound pattern discriminating system.

It is another object of this invention to provide an improved sound pattern discriminating system for controlling traffic signal lights in response to emergency vehicle sirens.

It is an additional object of this invention to provide an improved sound pattern discriminating system which effectively rejects extraneous noise and which is capable of responding to various different emergency vehicle siren signals.

It is a further object of this invention to provide an improved sound pattern discrimination system using a preprogrammed microcontroller employing one or more sound pattern recognition algorithms for effecting control of traffic signal lights.

In accordance with a preferred embodiment of th invention, a sound pattern discrimination and control system includes a first omni-directional sound pick-up microphone. A band-pass amplifier circuit is coupled between this microphone and a trigger circuit for supplying analog signals in the frequency band of the amplifier circuit to the trigger circuit, which produces a substantially square wave signal on the output thereof in response to the analog signal output. Directional sound pick-up microphones also are provided and are responsive to sound coming from different directions. Second and third band-pass amplifier circuits, having a band-pass frequency the same as the first band-pass amplifier circuit, are connected, respectively, between the second and third directional sound pick-up microphones and first and second analog-to-digital convertor circuits. These analog-to-digital convertor circuits each produce digital signals on the outputs which correspond to the relative amplitudes of the analog signals on the inputs. A counter is connected with the output of the trigger circuit, and a timer also is coupled with the counter to enable operation of the counter for preestablished time intervals. A pattern recognition comparator is coupled with the counter to produce output signals indicative of recognition of a predetermined sound pattern (as determined by the count in the counter) as that pattern occurs within the time intervals. The outputs of the converters are then used to produce an output indicative of the relative magnitude of the amplitudes of the signals supplied to the inputs of the converters to cause a directional control output to be supplied from the system whenever the sound pattern recognition comparison indicates recognition of the pre-established or desired sound pattern.

DETAILED DESCRIPTION

Figure 1:
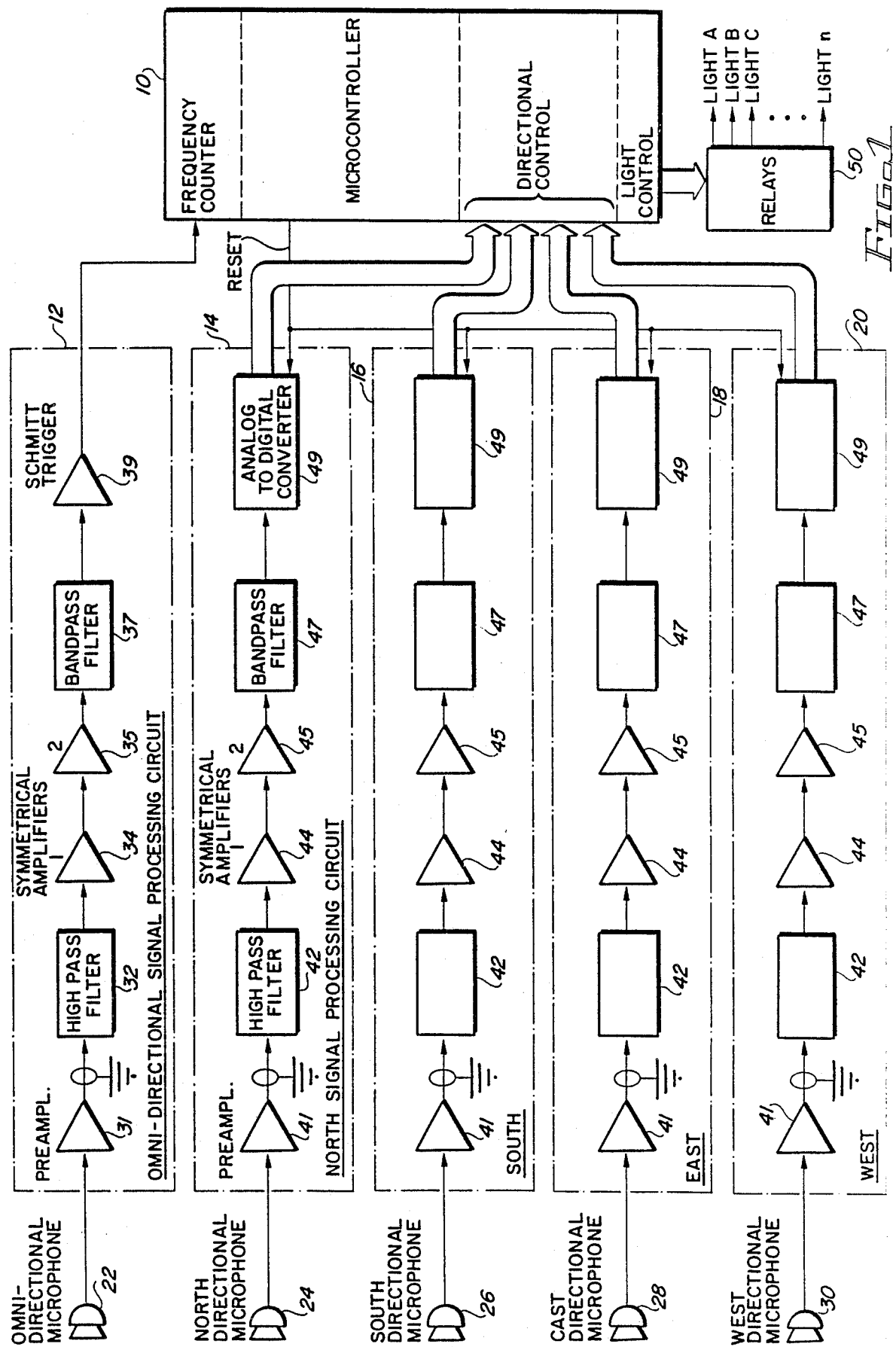
FIG. 1 is a block circuit diagram of a prefered embodiment of the invention.

Reference now should be made to the drawings in which the same reference numbers are used throughout the different figures to designate the same components. FIG. 1 is a block diagram of a preferred embodiment of the invention. Sound waves from an emergency vehicle operating in a standard mode such as "yelp", "hi-low", or "wail", as well as extraneous sounds impinging upon an omni-directional microphone 22 and four directional microphones 24, 26, 28 and 30 corresponding to north, south, east and west directions respectively. These microphones pick-up the sound signals which are processed by an omni-directional processing circuit 12 and four identical directional processing circuits 14, 16, 18 and 20 connected respectively to the outputs of the microphones 22, 24, 26, 28 and 30. These processing circuits 12, 14, 16, 18 and 20 are connected to appropriate inputs of a microcontroller or microprocessor circuit 10, an Intel 8052.

The microprocessor 10 responds to the signals received from the various processing circuits to determine first of all if an emergency vehicle siren is present. Then if such a siren signal is present, the circuit determines the direction from which the siren is approaching. With this information, the microcontroller 10 supplies control signals to relay circuitry 50 for controlling the traffic signal lights at an intersection. The number of signal lights may vary, depending upon the configuration of the intersection; but the system is selected to operate the lights to permit the safest passage of an emergency vehicle through the intersection. Typically, the control is such that the light is green in the direction of approach of the emergency vehicle and is red in all other directions, including the opposite side of the intersection from the emergency vehicle approach direction.

The omni-directional signal processing circuit 12 has the output of the omni-directional microphone 22 supplied through a first preamplifier circuit 31, typically located physically at the point of location of the microphone 22. The preamplifier 31 supplies electrical signals corresponding to the sound waves received by the microphone 22; and these amplified signals are supplied to the input of a high pass filter 32, which has a lower cutoff frequency of approximately 500 Hz. Depending upon the installation, the connection between the preamplifier 31 and the high pass filter 32 may be a considerable distance, even several hundred feet in length; so that a shielded cable (as indicated) may be used to interconnect the preamplifier 31 and the high pass filer 32.

The output of the high pass filter 32 then is supplied through two cascaded symetrical amplifiers 34 and 35 which further amplify, filter, and clip the signal to prevent overloading at the input of a following band-pass filter stage 37. If such overloading were allowed to occur, it could cause distortion of the signal and the generation of undesirable harmonic signals which could impair the accurate operation of the system. The band-pass filter 37 has a pass band which includes all of the frequencies typically found in standard sirens operating in any of the various modes (such as the three modes explained above). Typically, this pass band extends from 500 Hz to 1600 Hz. The filters 32 and 37 each have built-in low frequency rolloff characteristics, so that electrical signals outside this frequency band of interest are eliminated from further processing at this point in the system. This significantly reduces potential sources of false triggering or improper operation of the circuits in the microcontroller 10 due to spurious signals or harmonic distortion.

The output of the band-pass filter 37 is connected to the input of a Schmitt trigger 39. The Schmitt trigger 39 converts the alternating current signal input to a square-wave, positive voltage only signal with fast rise times and fast fall times. This "digitized" signal then is utilized as the signal train frequency source feed to the frequency counter portion of the microcontroller 10.

The microcontroller 10 internally has built-in counters and timers. The timers are preloaded with a program including predetermined sample and wait times for enabling the frequency counter to count the pulses at the output of the Schmitt trigger 39 for preestablished time intervals, separated by preestablished wait intervals before another counting interval begins. The sample and wait times vary in accordance with the internal program algorithm used to determine the presence of a particular type (or type) of emergency vehicle siren signal.

Before entering into a discussion of the manner in which this is done within the microcontroller 10, the other inputs to the microcontroller 10 also should be considered. These other inputs are those which are obtained from the directional microphones 24, 26, 28 and 30. The signal processing circuits 14, 16, 18 and 20 each are similar to the processing circuit 12 for the omni-directional microphone 22. Each of these circuits include a preamplifier 41 which is identical to the preamplifier 31 of the processing circuit 12. In addition, a high-pass filter 42, symmetrical amplifiers 44 and 45, and a band-pass filter 47 correspond to the filter 32, amplifiers 34 and 35 and band-pass filter 37 of the circuit 12.

The processing circuits 14, 16, 18 and 20, however, do not include a Schmitt trigger 39 of the type used in the circuit 12, but instead, the outputs of the band-pass filters 47 are supplied to analog-to-digital convertors 49 in each of these processing circuits. The analog-to-digital convertors 49 for the circuits 14, 16, 18 and 20 produce a digital output signal representation of the amplitude of the signal processed by the respective circuits 14, 16, 18 and 20. For a siren signal within the desired frequency range to which the processing circuits 14, 16, 18 and 20 are responsive, the different microphones pick-up signals of different intensities. The one of the microphones 24, 26, 28 or 30 which is pointed toward the emergency vehicle produces the highest amplitude signals for processing by the corresponding processing circuit. Consequently, that processing circuit produces on the analog-to-digital convertor 49 therein, a signal representation of a higher amplitude than is obtained from the other three directional processing circuits.

This information all is supplied to a directional control comparator section of the microcontroller 10 for producing an output signal to the traffic signal light control relays 50 to cause a "green" light to be effected on the side of an intersection facing an approaching emergency vehicle and "red" lights to be turned on for all other portions of the intersection. This light control, however, only takes place if the microcontroller pattern recognition algorithm detects a valid emergency vehicle siren pattern as determined by the output on the Schmitt trigger 39 of the processing circuit 12. If this pattern is not detected, the outputs of the circuits 14, 16, 18 and 20 are of no effect; and the relays 50 for the traffic signal lights at the intersection are controlled in their normal manner without any interference from the microcontroller circuit 10.

Figure 3A:
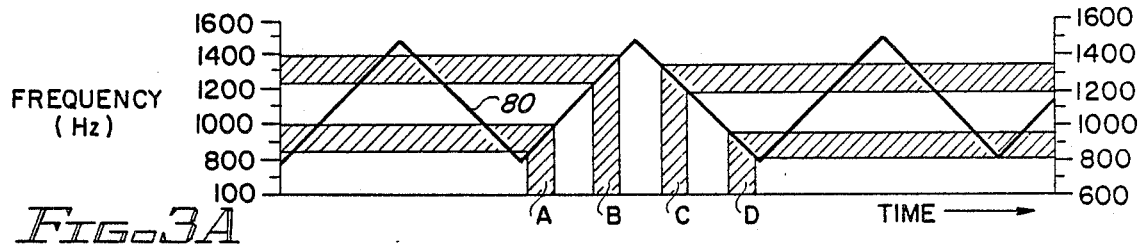
FIGS. 3A through 3C illustrative various waveforms and sampling characteristics useful in explaining the operation of the system of FIG. 1.
Figure 3B:
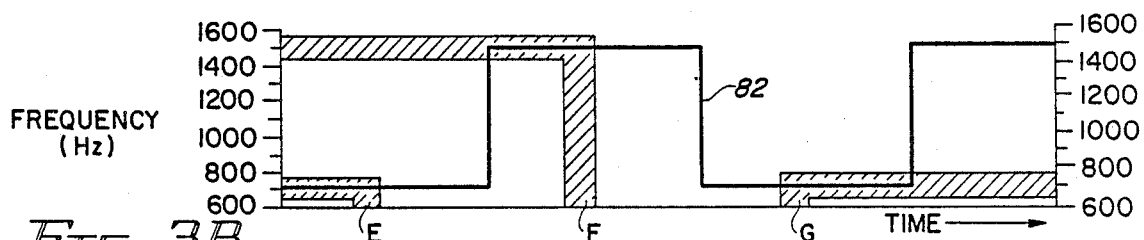
Figure 3C:
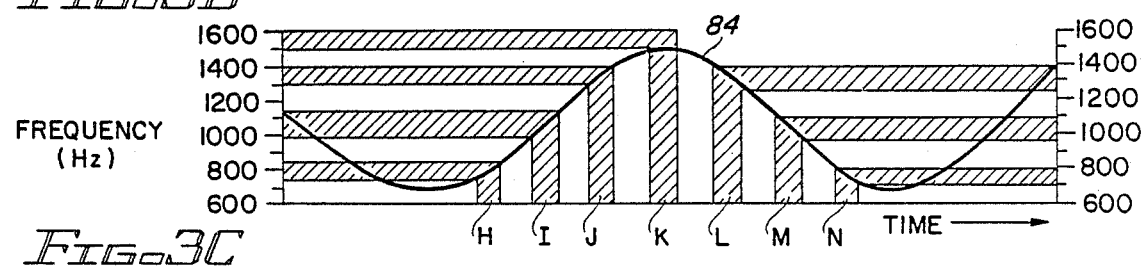

The microcontroller 10 internally has multiple built-in counters and timers. The timers are preloaded with one or more predetermined sample and wait times in accordance with the pattern detection algorithms for the siren signal characteristics of the signal which the microcontroller 10 is set to detect. Three different possible siren signal configurations are shown in FIGS. 3A, 3B and 3C. FIG. 3A is a representation of a "yelp" signal 80, FIG. 3B is a representation of a "hi-low" siren signal 82 of the type widely used in Europe, and FIG. 3C illustrates a different waveform 84. As is apparent from an examination of the waveforms of FIG. 3, all of these different types of siren signals use frequencies which are within the same pass band, namely 500 Hz to 1600 Hz.

The pattern recognition algorithm used to program the microcontroller 10 causes the internal timer of the microcontroller 10 to be loaded with a pre-established time out (example, ten milliseconds). The internal counter, which is supplied with signals from the output of the Schmitt trigger 39, is cleared and set equal to zero counts. The internal timer and this counter are enabled simultaneously, and counting begins for the predetermined period of ten milliseconds. At the conclusion of the timing period, the counter is disabled; and counting of the external signals from the Schmitt trigger 39 is terminated. Signals still may be present at the output of the Schmitt trigger 39, but these signals are ignored until a new timing period is initiated.

The count or number of pulses which is obtained from the output of the Schmitt trigger 39 during this ten millisecond timing period then is compared by internal arithmetic logic circuitry in the microcontroller 10 to a maximum and minimum limit. Different limits for different frequencies to be sampled are predetermined and programmed in the microcontroller 10.

In the case of a siren mode signal, such as shown in FIG. 3C, the "start" count is centered around 800 Hz. Using the ten millisecond timer, the "start" range is from approximately 750 Hz to 850 Hz, as indicated for the sample bar H, on FIG. 3C. The internal counter of the microcontroller 10 counts the periodic pulses from the Schmitt trigger 39 which correspond to signals in this range. If signals in the range of 750 to 850 Hz occur, the cycle of the output signals from the Schmitt trigger 39 occur in the range of 1.33 to 1.18 milliseconds, or 7.6 to 8.5 counts in the ten millisecond timing window.

Each of the various timing windows for the samples A through N of the different waveforms shown in FIGS. 3A through 3C are illustrated. If the microcontroller 10 detects counts which are outside the limits (either less or more) it merely begins the "start" algorithms again and resets the timer and counter back to zero. This "start" algorithm countinuously repeats until the starting frequency of the preprogrammed one or more of the desired siren waveforms frequencies occurs. As is apparent from an examination of FIGS. 3A through 3C, the count for the start of eaach of the different waveforms is different. The microcontroller 10 can be programmed to detect only one of these three (or some other) waveforms or may include an algorithm and comparison circuitry responding to any one of the three; so that the start algorithm is initiated whenever any one of the start frequencies in the samples A, E or H occurs.

Assume that the "start" range has been detected. The sound pattern recognition algorithm then takes over. The first action of the algorithm for any one of the waveforms shown in FIGS. 3A through 3C is to load the microcontroller internal timer with a "wait" state timing. The wait interval is different for detection of the three different waveforms, as is apparent by the spacing between the various samples, such as A, B, C, D for wave form 80; the spacing between samples E and F for the wave-form 82; and the spacing between the samples H, I, J, K, L, M, N for the waveform 84 of FIG. 3C. These "wait" intervals are used to insure that signal samples do not overlap. If the samples were allowed to overlap, mamimum and minimum limits would have no meaning, since maximum limits in one range could be greater than the minimum limits of the following range.

The internal timer is loaded with the ten millisecond time out. The internal counter with its input obtained from the Schmitt trigger 39 once again is cleared and set equal to zero counts. The timer and counter then are enabled simultaneously after the "wait" interval and counting begins for the predetermined period of ten milliseconds. If the system is made to respond simultaneously to any one of the different siren signals, the output of the Schmitt trigger 39 is directed to three different internal frequency counters corresponding to the algorithms for the different waveforms 80, 82 and 84 of FIGS. 3A, 3B and 3C which are to be detected by the system. The manner of operation of the microcontroller 10, however, is the same whether a single frequency counter is used or multiple frequency counters are used to receive the signals from the Schmitt trigger 39.

At the conclusion of the second or subsequent timing period of ten milliseconds, the input to the counter in the microcontroller 10 is disabled; and counting of the signals from the Schmitt trigger 39 ceases. The counted number of pulses produced from the incoming signal then is compared by the microcontroller internal arithmetic logic circuit to the maximum and minimum limit in the manner described previously. These limits, however, are different (higher for an ascending wave-form) from the "start" limits and are predetermined and programmed. If the count limits are exceeded (either too high or too low), the recognition algorithm is aborted; and the microcontroller is reset to begin searching for the "start" count again. Any out of limit detection causes the algorithm abortion, which accounts for the rejection of unwanted sound patterns caused by extraneous noise.

Acceptance of the second signal causes the recognition algorithm to repeat the wait and sample and check routine. This routine in the algorithm is repeated as many times as required to accurately recognize the sound pattern under evaluation. In the case of the "siren" mode signal of FIG. 3C, four samples on the rising edge and three samples on the falling edge have been found to be enough to ensure accurate recognition. As a sound pattern becomes increasingly complex, more samples, with tighter tolerances, are required for pattern recognition.

The inverse, however, also is true. As sound patterns become less complex, for example as with a "hi-low" siren pattern 82 (FIG. 3B), fewer samples need to be acquired to accurately recognize the pattern. In the case of a "hi-low" signal, it has been found that three samples E, F, and G are sufficient for pattern recognition. Since the microcontroller 10 is programmable, nearly any sound pattern may be detected and recognized using the same recognition algorithm by simply changing sample durations, wait states and the number of samples required.

Figure 2:
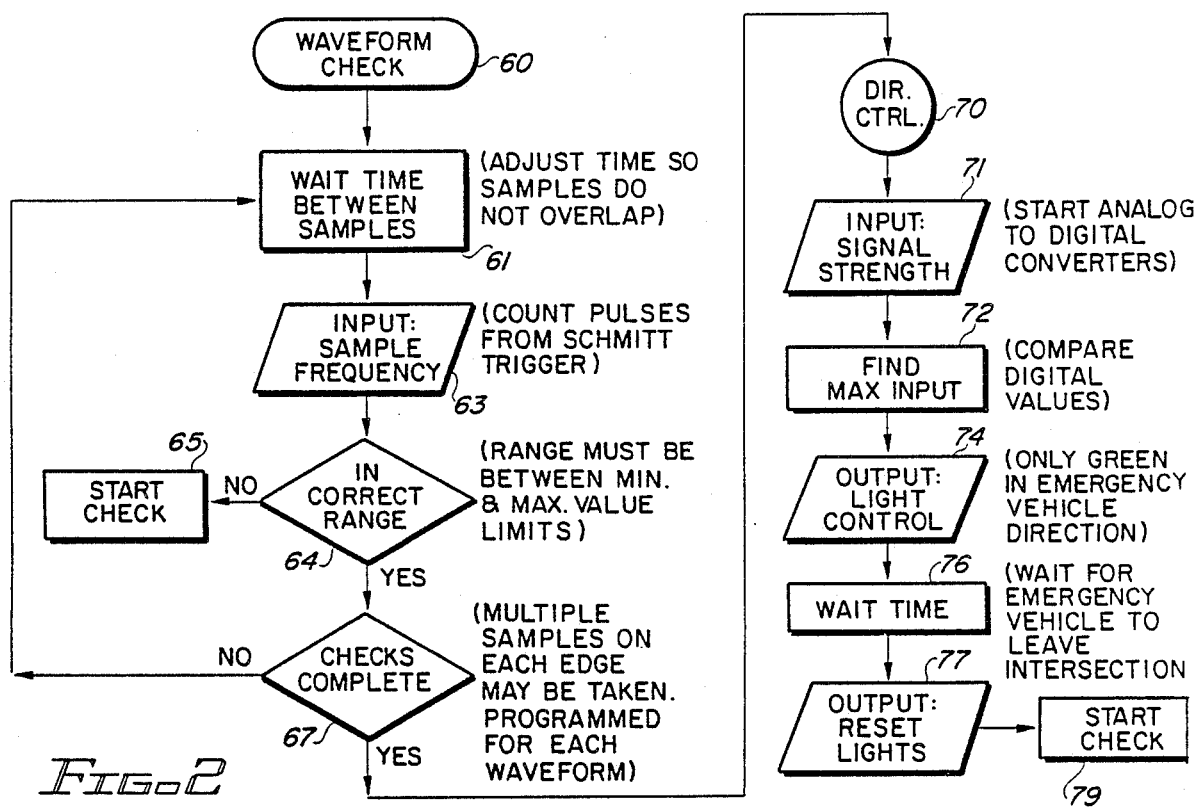
FIG. 2 is a flow chart useful in describing the operation of the system shown in FIG. 1.

The sequence of operation of the microcontroller 10 under control of the program algorithm is illustrated in the flow chart of FIG. 2. The initial operation is the waveform check 60 for determining the presence of a desired signal during the "start" interval. Once this has occured, the wait time between samples 61 is initiated and the pulses from the Schmitt trigger circuit are counted at the input sample frequency 63. If these pulses are in the correct range 64, for the desired number of samples, an indication that the check is complete 67, is effected. This then enables the traffic signal light direction control 70 to function.

The outputs of the analog-to-digital convertors in the processing circuits 14, 16, 18 and 20 first are reset and then are sampled in the microcontroller 10 to determine the input signal strength 71 from each of these processing circuits. The maximum signal from the four processing circuits is determined at 72 by comparing the digital values of the outputs of the various analog to digital convertors 49 in the microcontroller 10. This output then is supplied to a light control output 74 used to control the relays 50 (FIG. 1) to permit the emergency vehicle to safely enter the intersection. An internal timer is employed to maintain this status of the traffic signal lights for a preestablished time interval, after which time the output is provided to reset the lights 77 back to their normal operation. This in turn resets the microcontroller to once again start checking or looking for an emergency vehicle siren signal 79.

Figure 4:
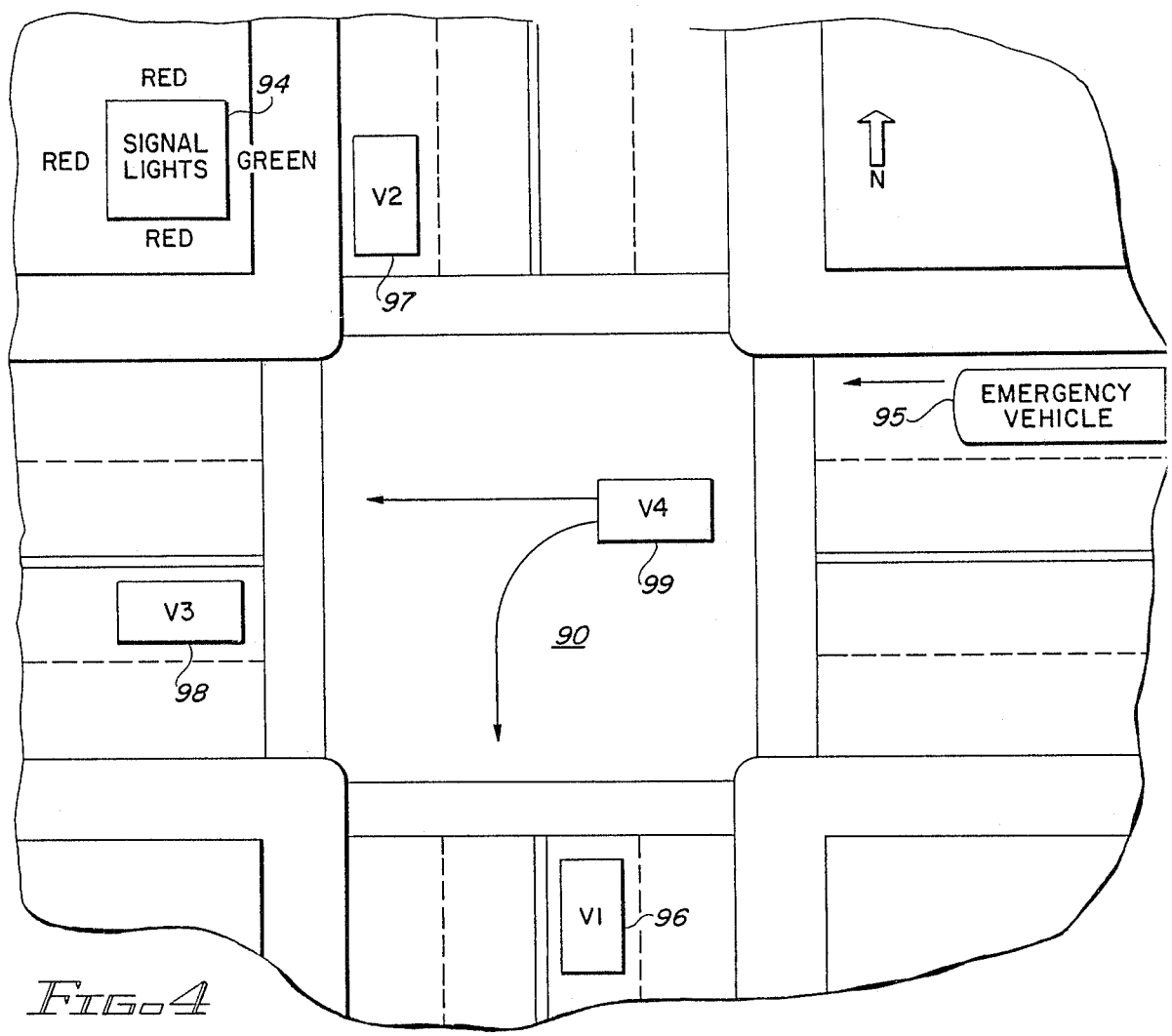
FIG. 4 is a diagrammatic representation of a traffic intersection of the type controlled by the system shown in FIG. 1.

FIG. 4 is a digramatic illustration of a typical intersection of the type which may be controlled by the system shown in FIG. 1 and described above. In FIG. 4, a traffic signal light post 94 is illustrated, which includes the control relays 50 indicated in FIG. 1. When an emergency vehicle 95 approaches the intersection 90 from the right (East), as illustrated, the omni-directional microphone 22 picks up the signals from the vehicle; and the system processes the siren signals, as described above, to produce an indication that a siren is being detected. The microcontroller 10 then turns over control of the relays 50 of the traffic signal lights 94 over to the directional control section of the microcontroller 10.

The East directional microphone 28 (FIG. 1) receives a stronger signal than any of the other three directional microphones, so that the analog to digital convertor output from the East signal processing circuit 18 is greater than the outputs of the other three directional signal processing circuits. This causes the traffic signal light control effected through the relays 50 to be such that a green light is shown on the East side of the intersection, while red lights are shown on all the other three sides. This is indicated in the upper left hand corner of FIG. 4. With the lights in this state, vehicles 96, 97, and 98 approaching the intersection from the South, North and West, all see red lights and come to a stop. A vehicle 99 moving in the same direction as the emergency vehicle 95 sees a green light and is able to either proceed straight through the intersection or to turn left, as indicated in FIG. 4. This clears the intersection for the emergency vehicle 95 which then can move through the intersection with a minimum possibility of a collision.

The system which is shown in the drawings and which has been described above is to be considered illustrative of the invention and not as limiting. As is readily apparent, the utilization of a programmed microcontroller employing a sound pattern recognition algorithm (or algorithms) provides considerable flexibility to permit a single sound pattern recognition or simultaneous monitoring of several sound patterns to the exclusion of other unwanted extraneous sounds. Various changes and modifications may be made to the system illustrated without departing from the scope of the invention.

I claim:

1. A sound discrimination and control system including in combination:

a first omni-directional sound pickup means;

trigger circuit means for producing a substantially square wave signal at the output thereof in response to an analog signal input;

first band-pass amplifier circuit means coupled between said first sound pickup means and the input of said trigger circuit means for supplying analog signals in a predetermined frequency band to said trigger circuit means from said sound pickup means;

second and third directional sound pickup means responsive to sounds from different directions;

first and second analog-to-digital converter means for producing a digital signal on the outputs thereof corresponding to the amplitude of analog signals on the inputs thereof;

second band-pass amplifier circuit means coupled between said second sound pickup means and the input of said first analog-to-digital converter means;

third band-pass amplifier circuit means coupled between said third sound pickup means and said second analog-to-digital converter means;

counter means coupled with the output of said trigger circuit means;

timer means coupled with said counter means for enabling operation of said counter means for predetermined time intervals;

pattern recognition comparator means coupled with said counter means for producing output signals indicative of recognition of a predetermined sound pattern;

control means coupled with the outputs of said first and second analog-to-digital signal converters for providing an output indicative of the relative magnitude of the amplitude of signals provided thereto; and means coupled with said sound pattern recognition means and said control means for providing an output signal indicative of the presence of a predetermined sound pattern and of the direction of such predetermined sound pattern.

2. The combination according to claim 1 wherein said first, second and third band-pass amplifier circuits all have the same frequency band-pass characteristics.

3. The combination according to claim 2 wherein said trigger circuit means comprises a Schmitt trigger circuit.

4. The combination according to claim 3 wherein said second and third directional sound pickup means responed to sounds from two directions displaced substantially 90° from one another.

5. The combination according to claim 4 wherein said timer means, said counter, said control means, and said pattern recognition means all comprise portions of a microcontroller circuit means.

6. The combination according to claim 5 wherein said microcontroller has a plurality of sound pattern recognition algorithms programmed therein, with each of said algorithms corresponding to different preestablished patterns of comparisons of counts from the counter means by said comparator means for recognizing different predetermined sound patterns.

7. The combination according to claim 6 wherein failure of any said predetermined algorithms upon initiation of operation by an output from said trigger circuit means to said counter means to continue the anticipated pattern causes said system to be reset to an initial condition.

8. The combination according to claim 7 wherein said counter means and said timer means are both coupled with the output of said trigger circuit means for causing said timer means and said counter means to initiate operation simultaneously, with said counter means being reset to an initial count and said timer means being reset to an initial state upon completion of comparison of the count in said counter means by said pattern recognition algorithm means.

9. The combination according to claim 8 further including fourth and fifth directional sound pickup means responsive to sounds from directions different from the directions of response of said second and third sound pickup means;
- third and fourth analog-to-digital converter means for producing a digital signal on the outputs thereof corresponding to the amplitude of analog signals on the inputs thereof;
- fourth band-pass amplifier circuit means coupled respectively between said fourth sound pickup means and the input of said third analog-to-digital converter means;
- fifth band-pass amplifier circuit means coupled between the output of said fifth sound pickup means and the input of said fourth analog-to-digital converter means; and
- said control means being further coupled with the outputs of said third and fourth analog-to-digital converter means for producing an ouput indicative of the one of said converter means representative of the greatest signal amplitude applied to the inputs of said converter means.

10. The combination according to claim 9 wherein said output signal is used for controlling the operation of traffic signal lights.

11. The combination according to claim 1 wherein said second and third directional sound pickup means respond to sounds from two directions displaced substantially 90° from one another.

12. The combination according to claim 11 wherein said timer means, said counter, said control means, and said pattern recognition means all comprise portions of a microcontroller circuit means.

13. The combination according to claim 12 wherein said output signal is used for controlling the operaton of traffic signal lights.

14. The combination according to claim 1 further including fourth and fifth directional sound pickup means responsive to sounds from directions different from the directions of response of said second and third sound pickup means;
- third and fourth analog-to-digital converter means for producing a digital signal on the outputs thereof corresponding to the amplitude of analog signals on the inputs thereof;
- fourth band-pass amplifier circuit means coupled respectively between said fourth sound pickup means and the input of said third analog-to-digital converter means;
- fifth band-pass amplifier circuit means coupled between the output of said fifth sound pickup means and the input of said fourth analog-to-digital converter means; and
- said control means being further coupled with the outputs of said third and fourth analog-to-digital converter means for producing an ouput indicative of the one of said converter means representative of the greatest signal amplitude applied to the inputs of said converter means.

15. The combination according to claim 1 wherein said counter means and said timer means are both coupled with the output of said trigger circuit means for causing said timer means and said counter means to initiate operation simultaneously, with said counter means being reset to an initial count and said timer means being reset to an initial state upon completion of comparison of the count in said counter means by said pattern recognition algorithm means.

16. The combination according to claim 1 wherein said output signal is used for controlling the operation of traffic signal lights.

17. The combination according to claim 1 wherein said timer means, said counter, said control means, and said pattern recognition means all comprise portions of a microcontroller circuit means.

18. The combination according to claim 1 further including wait timer means responsive to the operation of said enabling timer means for preventing said counter means and said enabling timer means from being reset to an initial operating condition until termination of a predetermined time interval by said wait timer means.

* * * * *